Oct. 13, 1931.    L. P. CROSET    1,827,461

DEVICE FOR STARTING INTERNAL COMBUSTION ENGINES

Filed Nov. 19, 1929    2 Sheets-Sheet 1

Patented Oct. 13, 1931

1,827,461

UNITED STATES PATENT OFFICE

LOUIS PAUL CROSET, OF STROOD, ENGLAND

DEVICE FOR STARTING INTERNAL COMBUSTION ENGINES

Application filed November 19, 1929, Serial No. 408,239, and in Great Britain November 19, 1928.

This invention relates to devices for starting internal combustion engines and particularly to devices of the type comprising a friction driving member arranged so that it can be moved into and out of frictional engagement with the flywheel or other engine driven member which is associated with the engine crankshaft and which for convenience is hereinafter referred to as a "flywheel".

The invention is particularly but not exclusively applicable to large or high compression internal combustion engines in connection with which the usual toothed flywheel ring is not desirable.

According to the invention the device consists of a self-contained unit comprising a substantially cylindrical housing rotatable about its longitudinal axis and having mounted eccentrically therein a friction driving member which is provided with annular gearing, one of the members of the latter being coaxial with the friction driving member and the other being co-axial with the housing. The friction driving member is mounted upon a shaft and may comprise a cylindrical member which is composed of, or is formed with an external coating of friction material or any other like material, for instance, raw hide, suitable for enabling rotary motion to be imparted to the flywheel when the friction driving member is set rotating and pressed into contact therewith. The shaft of the friction driving member is connected with the starting motor or other means for imparting initial movement to the flywheel and a lever may be connected to the housing so that when the lever is operated to cause the housing to move in its pivotal support the friction driving member is caused to move toward or away from the peripheral surface of the flywheel. The said lever may be spring loaded to transmit any predetermined torque to suit the engine to which the device is applied and may be arranged in a convenient position for operation by the hand or foot of the operator so that the friction driving member is normally held out of contact with the surface of the flywheel but may be brought into contact therewith by applying pressure to the lever, or the housing may be adapted to be turned in its pivotal support through the medium of other means, such as skew gearing or the like.

In order that the said invention may be clearly understood and readily carried into effect the same will now be more fully described with reference to the accompanying drawings in which:—

Figure 1:
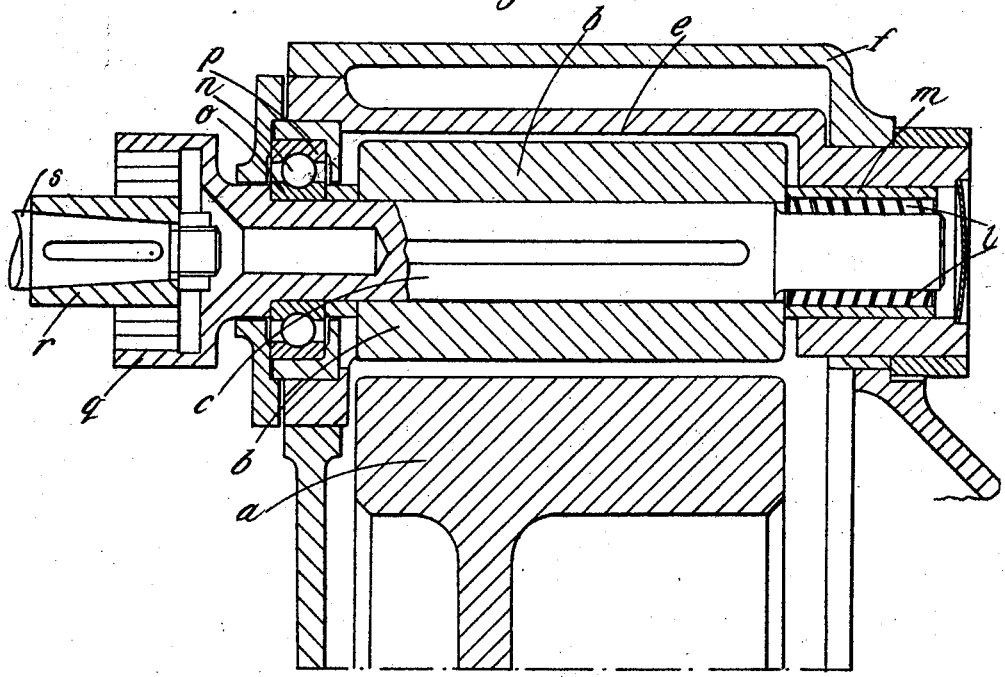
Figure 1 is a vertical longitudinal section through one form of starting device embodying the invention.
Figure 2:
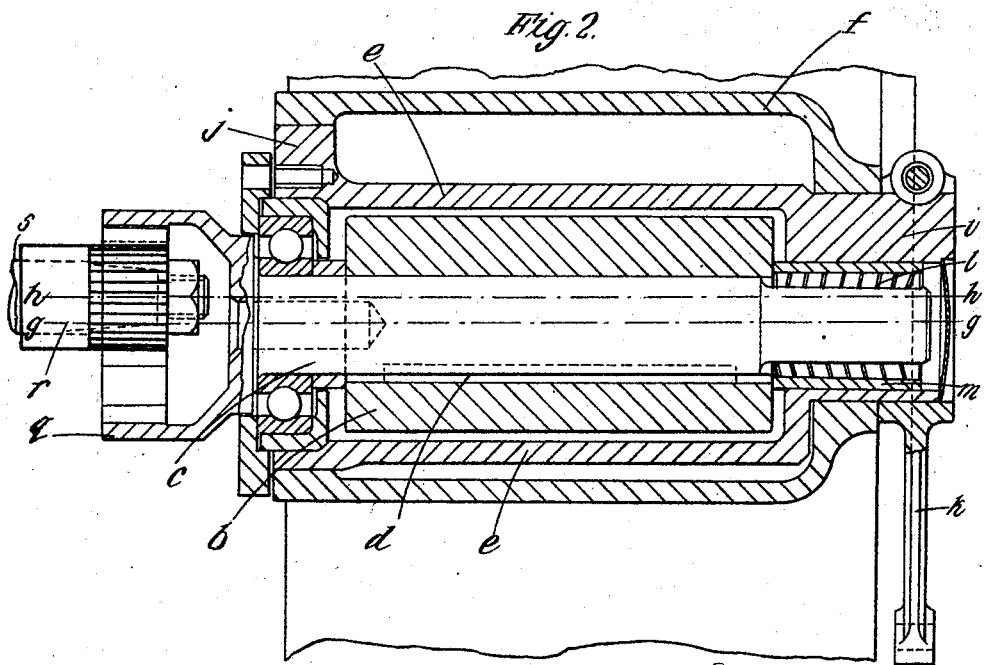
Figure 2 is a horizontal longitudinal section through the device as shown in Figure 1.
Figure 3:
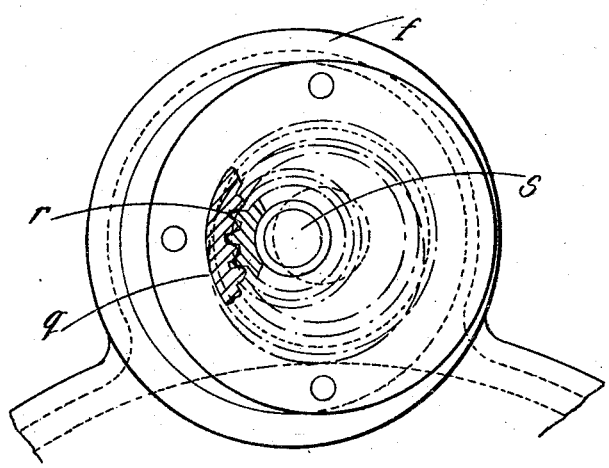
Figure 3 is a fragmentary view looking from the starting motor showing a part of the drive from the latter to the friction driving member.
Figure 4:
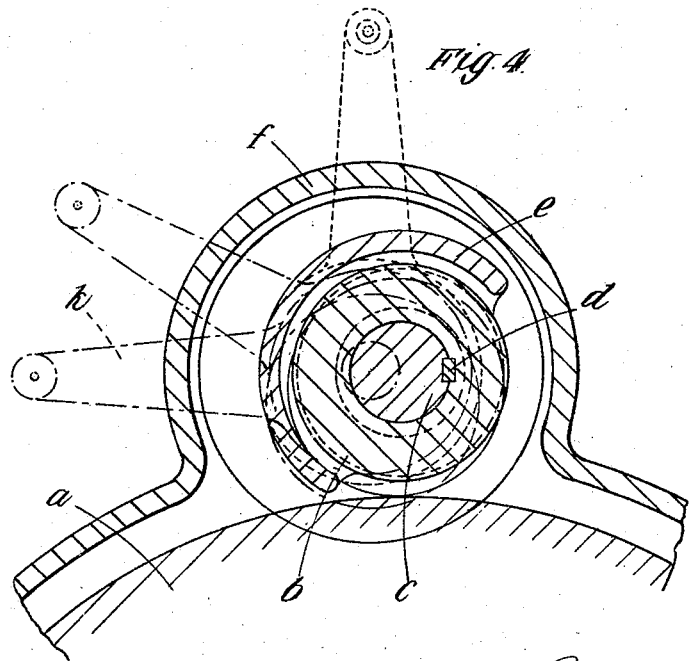
Figure 4 is a vertical transverse section through the device as shown in Figure 1, showing the formation of the housing by which the friction driving member is carried.

$a$ is the rim of the flywheel, $b$ is the friction driving member and $c$ is the shaft on which the friction driving member is secured by the key $d$. $e$ is the housing in which the friction driving member is rotatably mounted, such housing being pivotally mounted at its ends in a bulged part $f$ of the flywheel casing so that the axis of the pivot is spaced from the axis of the shaft of the friction driving member. In the arrangement shown $g-g$ (Figure 2) is the axis of the friction driving member and $h-h$ the axis about which the housing is adapted to be angularly or pivotally displaced. The housing comprises an arcuate member formed at one end with an eccentric trunnion-like part $i$ and at the other end with a flanged part $j$ concentric with the trunnion-like part, the latter being secured to a lever or arm $k$ by which the housing is adapted to be turned in its pivotal support.

In the arrangement shown, the shaft of the friction driving member is rotatably mounted in the housing by the aid of roller and ball bearings, roller bearings $l$ being interposed between a reduced part of the shaft $c$ and a bush $m$ in the housing $e$ at the right hand end of the friction driving member and a series of balls *n* with inner and outer ball races *o* and *p* respectively being interposed between the housing and the shaft at the other end of the friction driving member. It will be appreciated, however, that ball bearings may, if desired, be provided at each end of the shaft of the friction driving member.

The friction driving member is adapted to be driven from the starting motor through the medium of annular gearing which as illustrated, comprises an internal gear *q* formed in the end of the shaft of the friction driving member and a pinion *r* mounted on the end of the shaft *s* of the starting motor, the shaft *s* being arranged so that its axis is aligned with the axis *h—h* and the centres of the internal gear *q* and the pinion *r* being spaced apart a distance corresponding with the spacing between the axes *h—h* and *g—g*. By this arrangement the driving of the friction driving member will not be interfered with by the pivotal movements of the housing *e* and the internal gear *q* and the pinion *r* will remain in mesh for all positions of housing. If desired the positions of the internal gear and the pinion may be reversed so that the pinion is formed or mounted on the shaft of the friction driving member and the internal gear is formed or mounted on the shaft of the starting motor. A suitable form of free wheel, free wheel clutch or other means for preventing over-running of the starting motor may be provided for disconnecting the starting motor from the engine as the latter commences to function and increases its speed. The starting motor may be of the electric, petrol or air driven or other type, for instance, inertia starter. In connection with inertia starters wherein the energy stored in a small flywheel accelerated to high speed by either manual or electrical means is expended in rotating the flywheel of the engine, a torque overload release must normally be provided but when applied to drive a friction starting device in accordance with this invention the inertia starting motor need not be fitted with a torque overload release as the friction member itself may be loaded to transmit the torque required to start the engine to which it is applied.

What I claim and desire to secure by Letters Patent of the United States is:—

1. A device for starting internal combustion engines consisting of a self-contained unit comprising a substantially cylindrical housing rotatable about its longitudinal axis and having mounted eccentrically therein a friction driving member which is provided with annular gearing, one of the members of the letter being co-axial with the friction driving member and the other being co-axial with the housing.

2. A device for starting internal combustion engines comprising a rotatably mounted support, a friction driving member rotatably and eccentrically mounted in the support, means for rotating the support and means for driving the friction driving member, the latter means comprising annular gearing one of the members of which is co-axial with the support and the other being co-axial with the friction driving member.

3. A device for starting internal combustion engines comprising a rotatably mounted housing supported at each end thereof, a friction driving member rotatably and eccentrically mounted in the housing, means for rocking the housing about its longitudinal axis and means for rotating the friction driving member comprising annular gearing, one of the members of which is co-axial with the housing and the other being co-axial with the friction driving member.

4. An internal combustion engine comprising a flywheel and a starting device mounted adjacent the said flywheel, the said starting device comprising a substantially cylindrical housing rotatable about its longitudinal axis, a friction driving member rotatably and eccentrically mounted in the housing, means for rocking the housing about its longitudinal axis to cause the friction driving member to move into and out of contact with the flywheel and means for rotating the friction driving member through the medium of annular gearing, one of the members of the latter being co-axial with the housing and the other being co-axial with the friction driving member.

5. An internal combustion engine comprising a flywheel and a starting device mounted adjacent the said flywheel, the said starting device comprising a starting motor, a substantially cylindrical housing rotatable about its longitudinal axis, a friction driving member rotatably and eccentrically mounted in the housing, means for rocking the housing about its longitudinal axis to cause the friction driving member to move into and out of contact with the flywheel and gearing for rotating the friction driving member from the starting motor, the said gearing comprising a pinion on the starting motor shaft and co-axial with the axis of the housing and an internal gear on the friction driving member shaft and co-axial with the friction driving member.

LOUIS PAUL CROSET.